Jan. 5, 1932.   C. WOODS   1,840,180
GAS CONTROL
Original Filed Aug. 22, 1928

Cammie Woods, INVENTOR

BY Victor J. Evans ATTORNEY

WITNESS:

Patented Jan. 5, 1932

1,840,180

UNITED STATES PATENT OFFICE

CAMMIE WOODS, OF LUDLOW, KENTUCKY

GAS CONTROL

Application filed August 22, 1928, Serial No. 301,353. Renewed November 16, 1931.

This invention relates to valve means for closing the gas line to the burners of a stove or the like, after the flow has been temporarily checked, the general object of the invention being to provide means for closing the line when the flow of gas ceases for any reason so as to prevent escape of gas from the burners when the flow starts again, thus preventing injury to persons in the room or building.

Another object of the invention is to provide manually operated means for opening the line after it has been closed.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
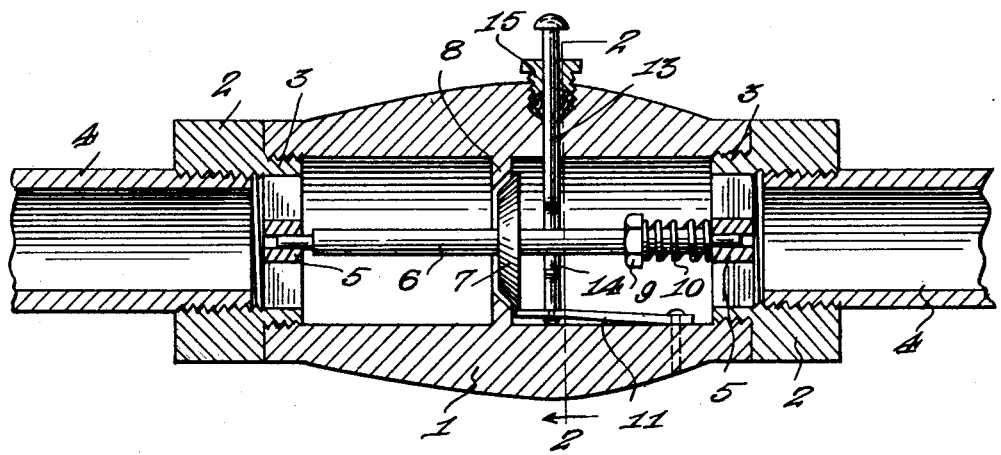
Figure 1 is a sectional view through the device.
Figure 2:
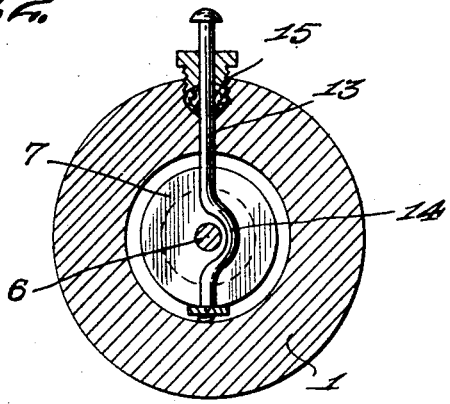
Figure 2 is a section on line 2—2 of Figure 1.
Figure 3:
Figure 3 is a view of the locking spring for the valve.

In these views, the numeral 1 indicates the body of the device and 2 indicates a nut threaded in each end of the device, each nut having a reduced part 3 at its inner end which is exteriorly threaded to engage threads in each end of the body. The nuts are also internally threaded to receive the threaded ends of the pipes 4 which form part of the supply line. A cross piece 5 is arranged in each reduced part 3 and each cross piece is provided with a centrally arranged hole to receive the reduced ends of the valve stem 6 which carries the valve 7, the body being provided with an annular internal flange 8 beveled on its periphery to form a seat for the valve 7. A nut 9 is placed on the stem and a spring 10 encircles a part of the stem and bears against the nut and one of the cross pieces and tends to hold the valve upon its seat. The spring is of such a strength as to permit the flow of gas, acting on the valve 7, to move the valve to open position so that the gas can pass the same, but when the flow ceases, the spring 10 will move the parts to close the valve. A leaf spring 11 is fastened to the bottom wall of the passage through the body and has its free end slightly beveled so that it will move upwardly in rear of the valve, as soon as the valve is seated, and thus prevent the valve from opening again. This spring 11 is provided with a transversely arranged slot 12 adjacent its free end to receive the lower end of a rod 13 which passes through a hole in the top of the body, the end of the rod being upset after it has been passed through the slot 12 so that the rod is connected with the spring. The rod is formed with an offset portion 14 so that it can pass the stem 6 and a packing gland 15 is provided for making a tight joint between the rod and the body.

From the foregoing it will be seen that gas can pass through the line to the burners, as the pressure of the gas against the valve 7 will hold the valve off its seat, but if the flow should cease for any reason, the spring 10 will force the valve 7 on its seat and then the spring 11 would move upwardly with its free end in engagement with the rear face of the valve and thus lock the valve in closed position. Thus if the gas should start to flow again, it cannot pass the valve and there is no danger of the gas escaping through the open burners. It is then necessary for one to push upon the rod 13 to lower the spring 11 and then the pressure of gas will open the valve 7 and as the end of the spring will engage the edge of the valve, the parts will remain in this position until the flow of gas ceases. Thus I have provided simple means for automatically preventing the gas from reaching the burners of a gas line after the flow has temporarily ceased and the flame at the burner is extinguished so that there is no danger of the gas escaping from the burners after the flow starts again.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A control comprising an elongated body having a bore extending endwise therethrough and provided with screw-threads at the ends of the body, internally screw-threaded attaching members having reduced portions threaded in the ends of the bore and having pipe sections of a pipe line threaded therein, a valve seat located in the bore intermediate the ends of the body, apertured supporting members carried by the reduced portions of the attaching members, a valve stem having the ends thereof slidable in the supporting members, a valve carried by the stem, a stop on the stem, a coiled spring between the stop and one of the supporting members to urge the valve into a seated position, a leaf spring secured in the bore at one end with the free end positioned to engage and hold the valve in a seated position, and an operating rod extending through one wall of the body and centrally of the bore and secured to the free end of the leaf spring to move the latter out of the path of the valve, said rod being offset to space that portion from the stem.

In testimony whereof I affix my signature.

CAMMIE WOODS.